(12) United States Patent
Tatsuta et al.

(10) Patent No.: US 8,305,863 B2
(45) Date of Patent: Nov. 6, 2012

(54) OPTICAL INFORMATION RECORDING APPARATUS

(75) Inventors: Shinichi Tatsuta, Tokyo (JP); Masataka Shiratsuchi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/069,620

(22) Filed: Mar. 23, 2011

(65) Prior Publication Data

US 2011/0170395 A1    Jul. 14, 2011

Related U.S. Application Data

(63) Continuation of application No. PCT/JP2009/065657, filed on Sep. 8, 2009.

(30) Foreign Application Priority Data

Sep. 25, 2008    (JP) ................... 2008-246441

(51) Int. Cl.
   *G11B 7/00*    (2006.01)
(52) U.S. Cl. ...................................... 369/103
(58) Field of Classification Search ................ 369/103; 359/1, 11, 10, 19, 30, 24; 365/125
   See application file for complete search history.

(56) References Cited

U.S. PATENT DOCUMENTS

| | | | | |
|---|---|---|---|---|
| 7,911,919 | B2 * | 3/2011 | Sugita et al. | 369/103 |
| 8,004,950 | B2 * | 8/2011 | Ide et al. | 369/103 |
| 8,085,643 | B2 * | 12/2011 | Shimada | 369/103 |
| 2006/0114792 | A1 | 6/2006 | Uno et al. | |
| 2006/0126143 | A1 | 6/2006 | Ezura et al. | |
| 2008/0291806 | A1 * | 11/2008 | Balistreri | 369/103 |
| 2010/0054103 | A1 | 3/2010 | Tatsuta et al. | |

FOREIGN PATENT DOCUMENTS

| | | |
|---|---|---|
| JP | 2006-154163 | 6/2006 |
| JP | 2006-155831 | 6/2006 |
| JP | 2006-215066 | 8/2006 |
| WO | 2007043451 A1 | 4/2007 |

OTHER PUBLICATIONS

International Search Report for PCT/JP2009/065657 Mailed on Nov. 17, 2009.
Written Opinion for PCT/JP2009/065657.
H.J. Coufal, et al., "Holographic Storage Data", Optical Sciences, Springer, pp. 25-28.

* cited by examiner

*Primary Examiner* — Nabil Hindi
(74) *Attorney, Agent, or Firm* — Turocy & Watson, LLP

(57) ABSTRACT

According to one embodiment, an optical information recording apparatus includes a spatial light modulator, an optical mechanism, a driving module, and a controller. The spatial light modulator converts an irradiation beam emitted from a light source to plural partial information beams that carry information by causing the irradiation beam to pass through plural modulation areas. The optical mechanism collects the partial information beams onto an optical information recording medium and applies a reference beam onto the recording medium such that the reference beam and the partial information beams intersect with each other on an information recording layer. The driving module drives the recording medium or the optical mechanism. The controller performs angle multiplex recording of information on the information recording layer by controlling the driving module and causing the light source to emit the irradiation beam while switchingly supplying the modulation areas with the information.

8 Claims, 8 Drawing Sheets

OPTICAL INFORMATION RECORDING APPARATUS

CROSS-REFERENCE TO RELATED APPLICATIONS

This application is a continuation of PCT international application Ser. No. PCT/JP2009/065657 filed on Sep. 8, 2009 which designates the United States; the entire contents of which are incorporated herein by reference.

FIELD

Embodiments described herein relate generally to an optical information recording apparatus that records and reproduces information as a hologram.

BACKGROUND

In recent years, high-density optical recording media of volumetric recording using holography (hereinafter, referred to as "holographic memory recording media") and recording and reproducing devices for holographic memory recording media have been developed for practical use.

As a multiplex recording method for increasing the recording density of a holographic memory recording medium, various methods such as angle multiplex recording and shift multiplex recording have been proposed. For example, "Holographic Data Storage" by H. J. Coufal, D. Psaltis, and G. T. Sincerbox published by Springer in 2000 discloses a general multiplexing method.

In any of them, the angle multiplex recording is performed by changing the relative angle between a reference beam and a medium at a certain angle step. In the angle multiplex recording, page data of a certain size (a certain number of modulation pixels) defined by the device employed is recorded for each recording angle. As illustrated in JP-A (KOKAI) No. 2006-154163, methods of changing the angle step depending on the recording angle have been studied. However, it has not been considered to change the size or shape of page data depending on the recording angle to increase recording density.

If the size or shape of page data is changed for each recording angle, it is possible to increase the recording density in some cases. If all the pixels in page data are recorded by the same angle step as in the conventional methods, there is still room for increasing the recording density.

DETAILED DESCRIPTION

In general, according to one embodiment, an optical information recording apparatus includes a spatial light modulator, an optical mechanism, a driving module, and a controller. The spatial light modulator converts an irradiation beam emitted from a light source to plural partial information beams that carry information by causing the irradiation beam to pass through plural modulation areas. The optical mechanism collects the partial information beams onto an optical information recording medium and applies a reference beam onto the recording medium such that the reference beam and the partial information beams intersect with each other on an information recording layer. The driving module drives the recording medium or the optical mechanism. The controller performs angle multiplex recording of information on the information recording layer by controlling the driving module and causing the light source to emit the irradiation beam while switchingly supplying the modulation areas with the information.

Various embodiments of an optical information recording apparatus will be described in detail hereinafter with reference to the accompanying drawings.

First Embodiment

Figure 1:
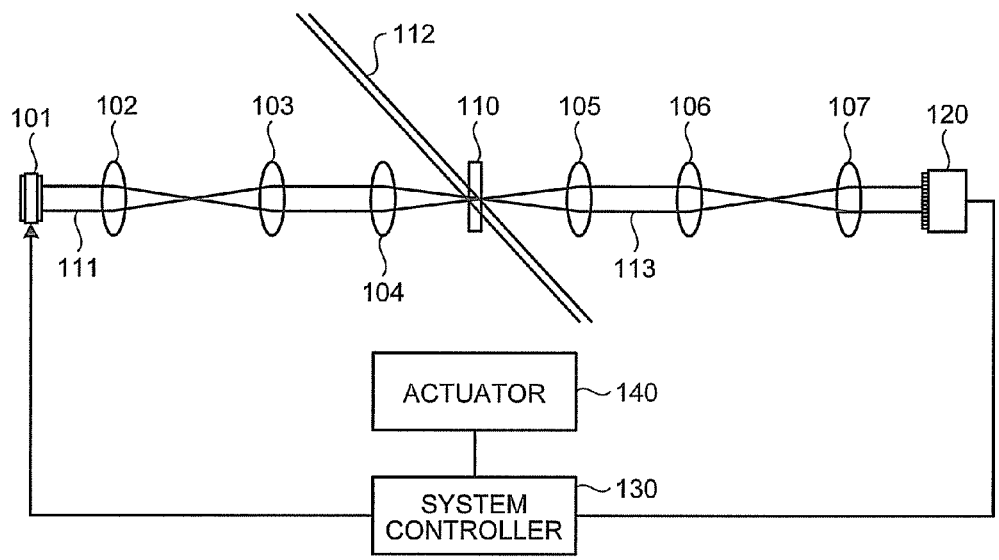
FIG. 1 is an exemplary schematic diagram illustrating a main configuration of an optical system of a recording and reproducing device.

FIG. 1 is an exemplary schematic diagram illustrating a main configuration of an optical system of a holographic memory recording and reproducing device according to a first embodiment. In the present embodiment, a two-beam optical system (optical mechanism) is used. The two-beam optical system is a system by which an information beam 111 and a reference beam 112 are made to enter a recording medium 110 so that the information beam 111 and the reference beam 112 are overlapped with each other on a hologram recording layer of the recording medium 110 functioning as a holographic memory recording medium, through separate objective lenses and the like. However, the optical system is not limited to the two-beam system. The optical system may also be a coaxial system (collinear system) by which the information beam and the reference beam are made to enter the recording medium 110 from the same direction so that the same central axis is commonly used through the same objective lens and the like.

In FIG. 1, to avoid complication, optical systems such as light sources of the information beam and the reference beam, an optical path from the light sources (not illustrated) to a spatial light modulator 101, a shutter, a wave plate, a polarization beam splitter, and the like are not illustrated. In FIG. 1, only an optical path required to describe the present embodiment, in which the information beam 111 and the reference beam 112 enter the recording medium 110 and an image pick-up device 120 detects a reproduction beam that has transmitted through the recording medium 110, is illustrated.

Only the outlines of the angles, positional relationships, the sizes, and the like of the optical components are illustrated for descriptive purposes.

The recording and reproducing device of the present embodiment has the same configuration as that of a general device capable of realizing the two-beam angle multiplexing method. The information beam 111 and the reference beam 112 are emitted from a single laser light source (not illustrated). The light flux emitted from the laser light source is shaped and enlarged or reduced by a collimator lens (not illustrated) depending on the needs, branched by a polarization beam splitter (not illustrated), and the like. It is preferable that optical path lengths of all the information beams 111 from when the information beams are branched to when the beams reach the hologram recording layer of the medium be approximately the same as that of the reference beam 112. It is also preferable that the difference of the optical path length be smaller than that of the coherence length of the laser light source.

In the recording and reproducing device according to the present embodiment, as illustrated in FIG. 1, the reference beam is applied to the recording medium 110 as a parallel light flux. A recording optical system of lenses 102, 103, and 104 is arranged between the spatial light modulator 101 and the recording medium 110. The lens 104 is an objective lens, and when information is recorded on the recording medium 110, the information beam 111 is modulated with the page data by the spatial light modulator 101, transmitted through the lenses 102 and 103, collected by the lens 104, and applied to the recording medium 110. The lenses 102 and 103 may be omitted from the optical system, as long as a Fourier transform image of the spatial light modulator 101 is formed on the recording medium 110 or near the recording medium 110 while information is being recorded. To such an extent, the arrangement of the optical components of the recording optical system is not limited to the configuration illustrated in FIG. 1, and for example, optical components such as a lens, a mirror, and a shutter may be additionally arranged in an appropriate manner. In the present embodiment, the reference beam 112 is a parallel light flux. However, it is not limited thereto.

The laser light that has entered the spatial light modulator 101 is converted into the information beam 111, after the intensity thereof is two-dimensionally modulated by the spatial light modulator 101. The spatial light modulator 101 is formed of a large number of bright points and dark points. The spatial light modulator 101 digitally encodes information to be recorded and has a data pattern that is a binary pattern (bright/dark pattern for each pixel) in which error correction is incorporated. The page data of the data pattern is formed by a system controller 130 and the information beam 111 whose intensity is modulated by the page data is applied to the hologram recording layer of the recording medium 110. Accordingly, a Fourier transform image is formed on the hologram recording layer or near the hologram recording layer.

In general, elements such as a liquid crystal element or a so-called digital micro-mirror device (DMD) capable of changing a transmittance, a phase, a reflection angle, a polarization direction, and the like of each pixel by using electrical signals may be used as the spatial light modulator 101.

The recording medium 110 is fixedly arranged on a stage (not illustrated) driven by an actuator 140 functioning as a driving module, so that the hologram recording layer is placed at the focal position of the objective lens 104.

However, the hologram recording layer is not necessarily placed at the focal position of the objective lens 104, and the position of the hologram recording layer and the focal position may be arranged shifted from each other.

The recording medium 110 of the present embodiment is a transmission type recording medium, and comprises two substrates facing each other and a hologram recording layer interposed between the two substrates and disposed on the substrate. However, the recording medium 110 is not limited thereto, and for example, may be formed as a reflection-type medium. As long as a hologram can be recorded or reproduced, the recording medium 110 may have a medium structure different from the structure described above. For example, the medium may have a disk shape, a square card shape, a columnar shape, or a spherical shape, as long as a hologram can be recorded or reproduced in some way.

The two substrates are formed of a material having optical transparency such as glass, plastic, polycarbonate, or acryl resin. However, the material of the substrates is not limited thereto. For example, the material of the substrates need not be transparent to all wavelengths of laser light, and may be transparent only to a wavelength of laser light to be used.

The hologram recording layer is formed of a hologram recording material. The hologram recording material is a material by which a hologram is formed by interfering the information beam 111 and the reference beam 112 of the laser light. In general, a photopolymer is used as the hologram recording material. The photopolymer is a photosensitive material using photo polymerization of a polymerizable compound (monomer). In general, the photopolymer contains a monomer as a main component, a photo polymerization initiator, and a porous matrix that maintains the volume before and after recording. However, the hologram recording material is not limited thereto. For example, materials capable of recording and reproducing a hologram such as a dichromated gelatin and a photorefractive crystal may also be used as the hologram recording material. The thickness of the hologram recording layer is preferably equal to or more than approximately 100 micrometers to obtain sufficient diffraction efficiency for reproducing signals and to obtain sufficient angular resolution during angle multiplexing.

In such an optical mechanism, a hologram is recorded on the hologram recording layer of the recording medium 110 as follows: the information beam 111 and the reference beam 112 are applied to a medium, so that the information beam 111 and the reference beam 112 are overlapped with each other on the hologram recording layer to form an interference fringe. At this time, if the hologram recording material is a photopolymer, a photo polymerization initiator in the photopolymer is activated by absorbing photons. Accordingly, the polymerization of the monomer in the bright portions of the interference fringe is started and accelerated. When the polymerization of the monomer progresses and the monomer in the bright portions of the interference fringe is consumed, the monomer in the dark portions of the interference fringe is moved and supplied to the bright portions. As a result, a density difference is generated between the bright portions and the dark portions of the interference fringe pattern. Consequently, a refractive-index modulation corresponding to the intensity distribution of the interference fringe pattern is formed, thereby recording the hologram.

In the present embodiment, an xyz orthogonal coordinate system fixed to the hologram recording layer of the recording medium 110 is taken into consideration. A recording spot formed on the medium surface of the hologram recording layer formed by the information beam 111 and the reference beam 112 is assumed as an original point. A z-axis is taken in the thickness direction of the recording medium 110 (in other words, the direction perpendicular to the medium surface).

An x-axis and a y-axis are taken in the directions perpendicular to the z-axis, in other words, in the directions perpendicular to each other on the medium surface of the hologram recording layer.

In the present embodiment, a θy multiplex recording is performed in which information is recorded by rotating (θy rotation) the recording medium 110 at each θy angle step about the y-axis (in-plane axis) by the actuator 140 based on instructions from the system controller 130. The θy angle step is a unit angle used to rotate the recording medium 110 (or an optical component) by θy during the θy multiplex recording. In the present embodiment, the θy multiplex recording is performed on the recording medium 110. However, it is not limited thereto. For example, a θz multiplex recording in which information is recorded by rotating (θz rotation) the recording medium 110 about the z-axis at each θz angle step, or a recording method combined with the θy multiplex recording and the θz multiplex recording may be used.

To reproduce the recording medium 110, only the reference beam 112 is made to enter the recording medium 110 by closing the shutter (not illustrated) and blocking the information beam 111 based on instructions and the like from the system controller 130. At this time, a reproduction beam 113 is emitted from the recording medium 110, passes though lenses 105, 106, and 107 functioning as a reproduction optical system, and enters the image pick-up device 120. The image pick-up device 120 receives the reproduction beam 113, obtains a reproduced image from the reproduction beam, converts the image to electric signals, and transmits the signals to the system controller 130.

The image pick-up device 120 may be a two-dimensional image sensor such as a charge coupled device (CCD) or a complementary metal-oxide semiconductor (CMOS). However, the image pick-up device 120 is not limited thereto. For example, a one-dimensional linear image sensor for scanning or an image pick-up tube may be used as the image pick-up device 120.

When information is reproduced, if the reproduction optical system is used in which an actual image of an image reproduced from the recording medium 110 is projected onto the image pick-up device 120, the reproduction optical system may be formed by omitting the lens 106 and the lens 107. However, the arrangement of the optical components of the reproduction optical system is not limited thereto. For example, optical components such as a lens and a mirror may be additionally arranged in an appropriate manner.

The reference beam 112 may enter the medium from the same direction as that of the reference beam 112 during recording, or may enter the recording medium 110 from the direction opposite from that of the reference beam 112 during recording. In particular, if the latter is used, the lenses 105, 106, and 107 can be omitted. In such an event, it is preferable to form an optical system such that a reproduced image can be obtained while the reproduction beam 113 reproduced from the recording medium 110 at least passes through the lens 104 in the direction opposite from that of the information beam 111. This method is called a reproduction using phase conjugation and is capable of relaxing the conditions required for the objective lens 104.

Figure 2:
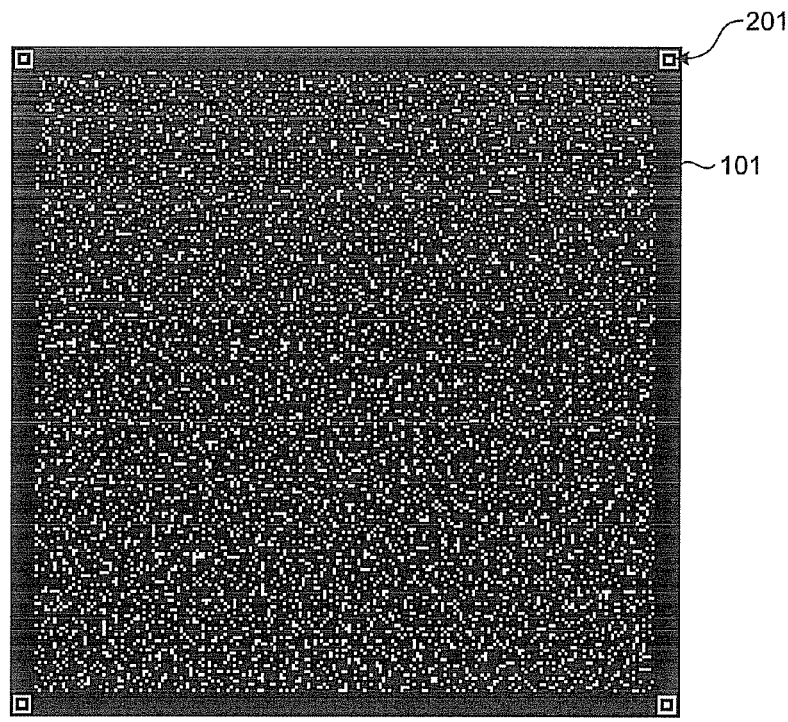
FIG. 2 is an exemplary schematic diagram illustrating a data pattern in a square.

The spatial light modulator 101 and the angle multiplex recording of the present embodiment will now be described. FIG. 2 is an exemplary schematic diagram illustrating a data pattern (page data) in a square displayed on the spatial light modulator 101 during the recording of information. The spatial light modulator 101 spatially modulates the information beam 111 by using such a data pattern. In FIG. 2, data is arranged in the center and sync marks 201 used for positioning and the like during reproduction are disposed at four corners. However, the arrangement is not limited thereto. For example, the sync marks 201 may be mixed in the data area, and the shape of the data area may be different from the square shape. In other words, the sync marks 201 and the data area may have any pattern or shape.

The information beam 111 modulated by the spatial light modulator 101 is converged by the objective lens 104 in FIG. 1, and applied to the recording medium 110. Accordingly, the angle between the reference beam 112 and each of the information beams 111 differs in the light flux of the information beams 111. In other words, partial information beams that are partial beams forming the information beams 111 emitted from the pixels in the data pattern of the spatial light modulator 101 pass through different portions of the objective lens 104 and enter the recording medium 110 at different angles. Accordingly, the angles between each of the partial information beams and the reference beam 112 are different. Hereinafter, the angle is referred to as an RS angle.

Figure 3:
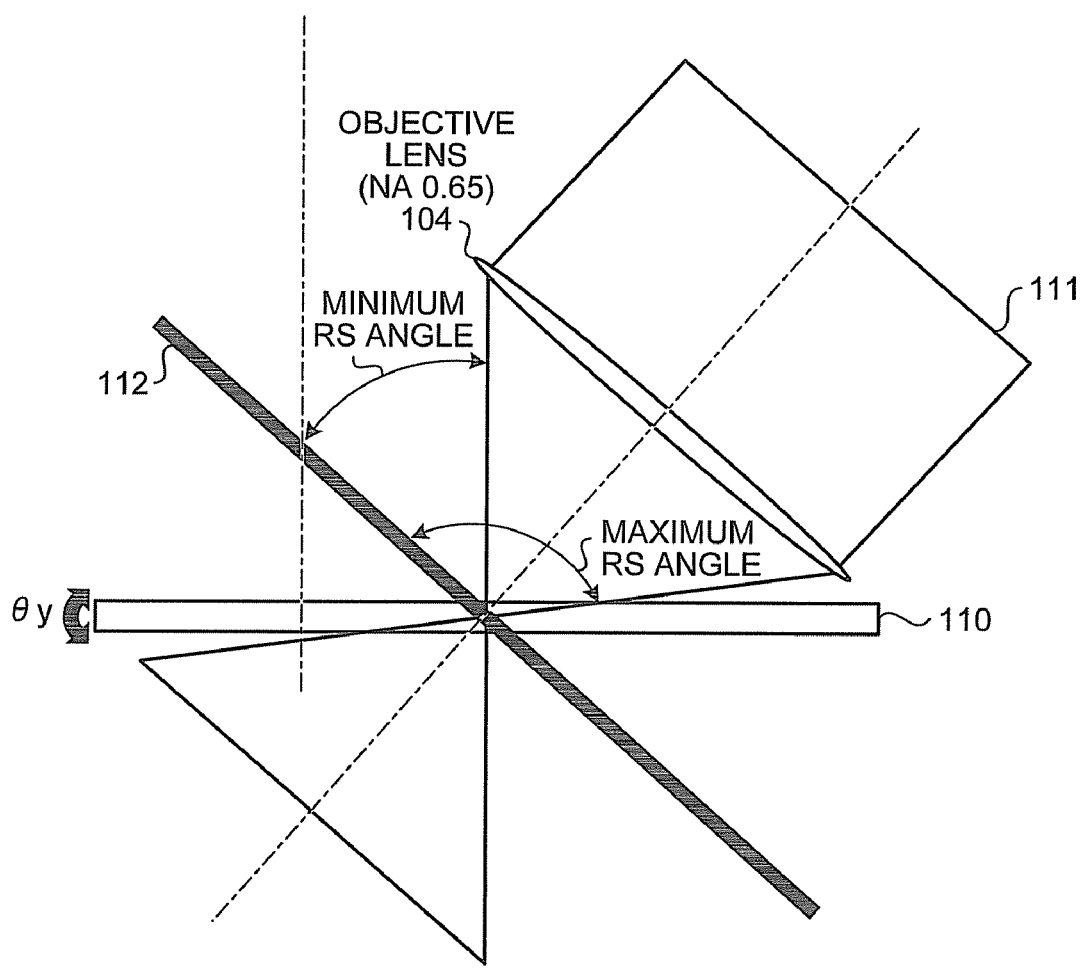
FIG. 3 is an exemplary schematic diagram explaining RS angles.

FIG. 3 is an exemplary schematic diagram explaining the RS angle. FIG. 3 illustrates a state of the RS angle between the reference beam 112 and (partial information beams in) the information beam 111 where the numerical aperture (NA) is 0.65. As the example illustrated in FIG. 3, the difference between a maximum RS angle and a minimum RS angle among the RS angles between the information beam 111 and the reference beam 112 is approximately 81 degrees.

The RS angle is one of elements for determining the angular selectivity. The smaller the RS angle is, the poorer (wider) the angular selectivity is, if the other conditions are the same. Here, the angular selectivity is an index indicating the relationship between the intensity of diffracted light and the incident angle of the reference beam. The angular selectivity is also a property in which, if the relative angle between the reference beam 111 and the recording medium 110 (incident angle of the reference beam 112) is changed from the angle when information is being recorded, the intensity of the reproduction beam (diffracted light of the reference beam) is changed depending on the changed angle.

Figure 4:
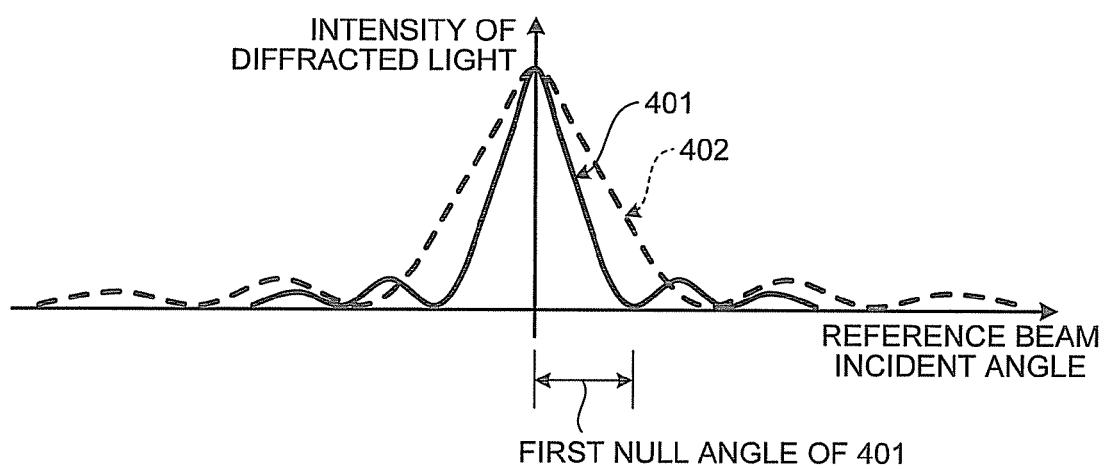
FIG. 4 is an exemplary schematic diagram illustrating a relationship between angular selectivity and the intensity of diffracted light.

FIG. 4 is a graph illustrating a relationship between the angular selectivity and the intensity of diffracted light. As illustrated in FIG. 4, in the situation where angular selectivity is poor (wide) (reference numeral 402 in the graph), reduction of the intensity of the diffracted light is small compared with the situation where angular selectivity is good (narrow) (reference numeral 401 in the graph), assuming that the incident angle of the reference beam 112 is the same. As illustrated in FIG. 4, an angle at which the intensity of the diffracted light becomes local minimum for the first time is called a first null angle.

When the intensity of the diffracted light is reduced, the reproduced image becomes dark. In other words, among the partial information beams that have passed though the data pattern of the spatial light modulator 101, the reproduced image of the partial information beam with a small RS angle tends to stay bright even if the incident angle of the reference beam 112 is changed significantly, compared with the reproduced image of the partial information beam with a large RS angle. In other words, the reproduced image of the partial information beam with a large RS angle becomes dark even if the incident angle of the reference beam is changed slightly, compared with the reproduced image of the partial information beam with a small RS angle. If the reproduced image becomes sufficiently dark, crosstalk does not occur even if new data is recorded. The crosstalk is a phenomenon in which data recorded at an adjacent angle leaks into the reproduced image during reproduction.

Accordingly, in the data pattern of the spatial light modulator 101, the angle multiplex recording or reproduction can be performed using a smaller θy angle step on the portion with good angular selectivity (in other words, the partial information beam with a large RS angle) than a portion with poor angular selectivity (in other words, the partial information beam with a small RS angle).

Accordingly, in the present embodiment, it is preferable to perform the angle multiplex recording by dividing the spatial light modulator 101 into a plurality of modulation areas where a certain number of pixels are enclosed depending on the size of the RS angle, in other words, depending on the angular selectivity, and by using a different θy angle step at each modulation area. In other words, the angle multiplex recording should be performed by applying different θy angle steps on the partial information beams that pass through the modulation areas.

In the following explanation, the modulation area of the spatial light modulator 101 is divided into two. However, the modulation area may be divided into three or more areas through which the partial information beams having different angles with the reference beam pass. The more the area is divided, the more improved the recording density of the recording medium 110 is. This is because, by doing so, it is possible to record information onto each of the divided areas by a suitable angle step. If the modulation area can be divided to infinity, depending on the conditions, the recording density can be increased by more than two times. However, if the division number is increased, the time and efforts required to process signals and images are increased as much as the areas are increased. Accordingly, the more recording capacity is required for the recording material of the hologram recording layer as much as the division numbers are increased. Consequently, the optimal division number of the modulation area needs to be determined taking signal processing capacity, image processing capacity, and recording capacity of recording materials into consideration.

Figure 5:
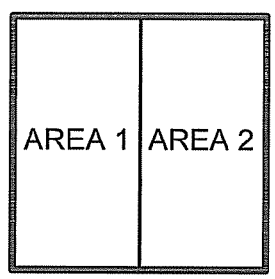
FIG. 5 is an exemplary schematic diagram illustrating a spatial light modulator 101 being divided.

In the present embodiment, the spatial light modulator 101 is divided into an area 1 through which the partial information beam with the maximum RS angle passes and an area 2 through which the partial information beam with the minimum RS angle passes. FIG. 5 is an exemplary schematic diagram illustrating the spatial light modulator 101 of the first embodiment being divided. In other words, the area 1 is an area with good angular selectivity and the area 2 is an area with poor angular selectivity. The angular selectivity at the boundary line (dividing line) between the area 1 and the area 2 is approximately the same. Here, FIG. 5 is a state where the spatial light modulator 101 is viewed from the upper right direction in FIG. 3.

The line for dividing the area is not limited to the straight line as illustrated in FIG. 5, but may also be an arc line or a free curved line. However, it is preferable that the line be formed of continuous pixels having approximately the same angular selectivity. This is because, if such a line is used, it is possible to eliminate the inefficiency caused when angular selectivity of a part of a small number of pixels in the area is reduced. It is also possible to easily deal with the increase in the uneven luminance in the reproduced image generated because of the temperature change. At any event, it is preferable to divide the area so that the device can be balanced, while increasing the recording density and considering the transmission rate and the signal processing of the reproduced image, difficulties, and the like.

The angle multiplex recording with a small θy angle step is performed on the partial information beams that have passed through the area 1, and the angle multiplex recording with a large θy angle step is performed on the partial information beams that have passed through the area 2. Data supplied to the modulation areas is formed by the system controller 130 every time the areas are switched.

If a maximum first null angle among the first null angles of the pixels in the spatial light modulator 101 comprised in the area 1 is F1, and a maximum first null angle among the first null angles of the pixels in the spatial light modulator 101 comprised in the area 2 is F2, the relation is F1<F2.

If the θy angle step that is an angle at which the information is recorded or reproduced on/from the area 1 is S1 and the θy angle step that is an angle at which the information is recorded or reproduced on/from the area 2 is S2, to prevent crosstalk from occurring, it is preferable that the relation be F1≦S1 as well as F2≦S2. However, if the crosstalk is acceptable, it is not limited thereto. At any event, from the point of recording density of the angle multiplexing, it is preferable that the relation be S1<S2 based on good or poor angular selectivity.

Figure 6:
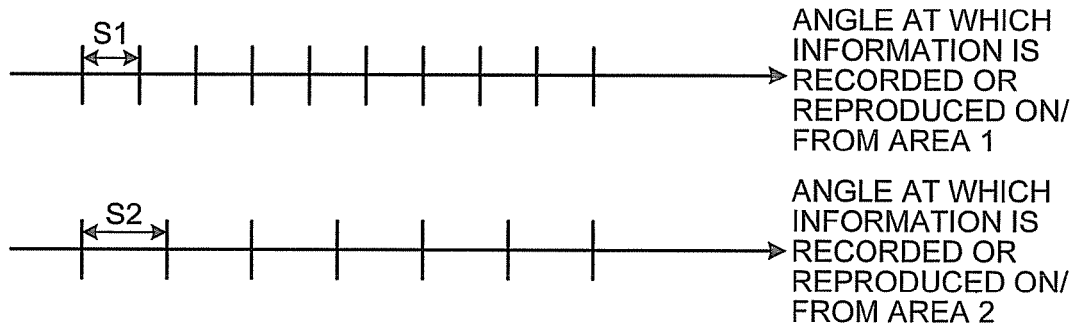
FIG. 6 is an exemplary schematic diagram illustrating θy angle steps relative to an area 1 and an area 2.

FIG. 6 is an exemplary schematic diagram illustrating the θy angle step relative to the area 1 and the θy angle step relative to the area 2. As illustrated in FIG. 6, if the relation of S1×N=S2×M (N and M being natural numbers equal to or more than one, N≧M) is satisfied, the number of recording operations can be reduced by causing the system controller 130 to control so that recording and reproduction can be performed at the same angle at every S1×N (=S2×M).

Figure 7:
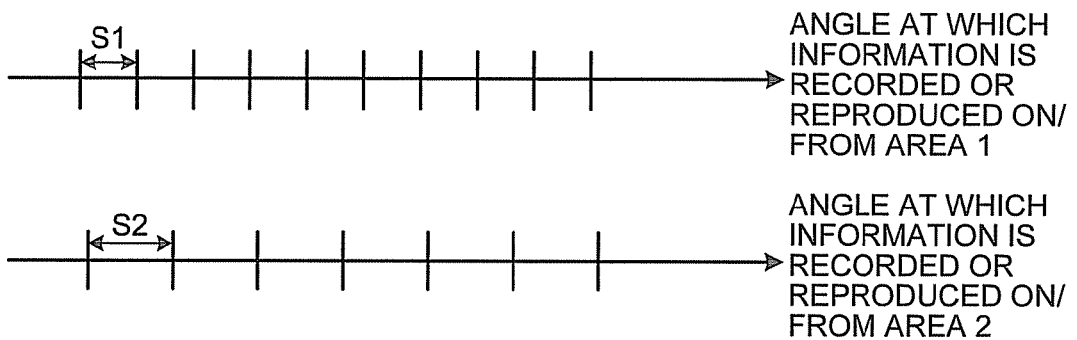
FIG. 7 is an exemplary schematic diagram illustrating θy angle steps relative to the area 1 and the area 2.

However, it is not limited thereto. For example, as illustrated in FIG. 7, even if the relation of S1×N=S2×M (N and M being natural numbers equal to or more than one, N≧M) is satisfied, the θy angle steps may be shifted so that recording and reproduction are not performed at the same angle. It is also possible to cause the system controller 130 to control recording and reproduction so that the relation of S1×N≠S2×M is satisfied.

In the θy angle step of the θy multiplex recording, the angle must be set to an angle equal to or more at which information can be reproduced separately from the adjacent page. Diffraction efficiency when the θy angle step is shifted as much as a minute angle Δθy from the position where information is recorded is proportionate to the square of a sinc function. An angle (first null angle) at which the intensity of the reproduction beam first becomes 0 is expressed by Expression (1) as disclosed in a technical literature (Bell Syst. Tech. J.48, 2909-(1969)). Hereinafter, the first null angle is indicated by Δθy.

$$\Delta\theta_y = \frac{\lambda}{nt} \frac{\cos\theta_s}{|\sin(\theta_r - \theta_s)|} \quad (1)$$

Here, λ is a wavelength in a vacuum, n is a medium refractive index, t is the thickness of the recording medium 110, θs is a projection angle in the recording medium 110 relative to an x-z plane of the incident angle of the information beam 111 (azimuth angle from the z-axis in the x-z plane), and θr is a projection angle in the recording medium 110 relative to the x-z plane of the incident angle of the reference beam 112 (azimuth angle from the z-axis in the x-z plane).

In the following, unless otherwise specified, the same applies regardless of the number of the system of the reference beam. If the reference beam 112 has an azimuth angle in the x-y plane, when an angle of the azimuth angle is expressed as an elevation angle ξr in the recording medium 110 relative to the x-z plane, the first null angle Δθy indicated by Expression (1) can be analytically calculated as Expression (2).

$$\Delta\theta_y = \frac{\lambda}{nt} \frac{\cos\theta_s}{|\cos\varsigma_r||\sin(\theta_r - \theta_s)|} \qquad (2)$$

For example, if two reference beams are used, an azimuth angle of the first reference beam becomes θs and an elevation angle becomes ξr, and an azimuth angle of the reference beam 112 becomes θs and an elevation angle becomes −ξr.

In the present embodiment, the first null angle Δθy is calculated using Expression (2) in advance, the calculated first null angle Δθy is determined as the θy angle step of the θy multiplex recording, and stored in memory and the like of the system controller 130. The system controller 130 performs the θy multiplex recording by reading out the θy angle step from the memory when information is recorded, and transmitting an instruction to the actuator 140 so that the recording medium 110 is rotated by θy at each θy angle step.

Instead of calculating the first null angle Δθy by using Expression (2), the first null angle Δθy may also be calculated by using other methods. When calculation is carried out considering the temperature, the angle relationship between the information beam 111 or the reference beam 112 and the recording medium 110, and the like, the other calculating method should be used.

If the first null angle Δθy differs in the page or between the pixels in the divided areas 1 and 2, the larger first null angle Δθy is used.

In the present embodiment, to improve the recording density, the θy angle step and the first null angle Δθy are the same angle. However, the θy angle step may be determined based on the first null angle Δθy, and is not limited to the present embodiment. For example, to obtain a certain margin, the θy angle step may be set as certain times of the first null angle Δθy. The θy angle step may also be a sum of the first null angle Δθy and a certain angle. Not only the θy angle step is set as certain times of the first null angle Δθy or the θy angle step has a certain angle difference with the first null angle Δθy, the θy angle step may be defined by changing the magnification or the angle difference relative to the first null angle Δθy depending on the incident angle of the reference beam 112.

Figure 8:
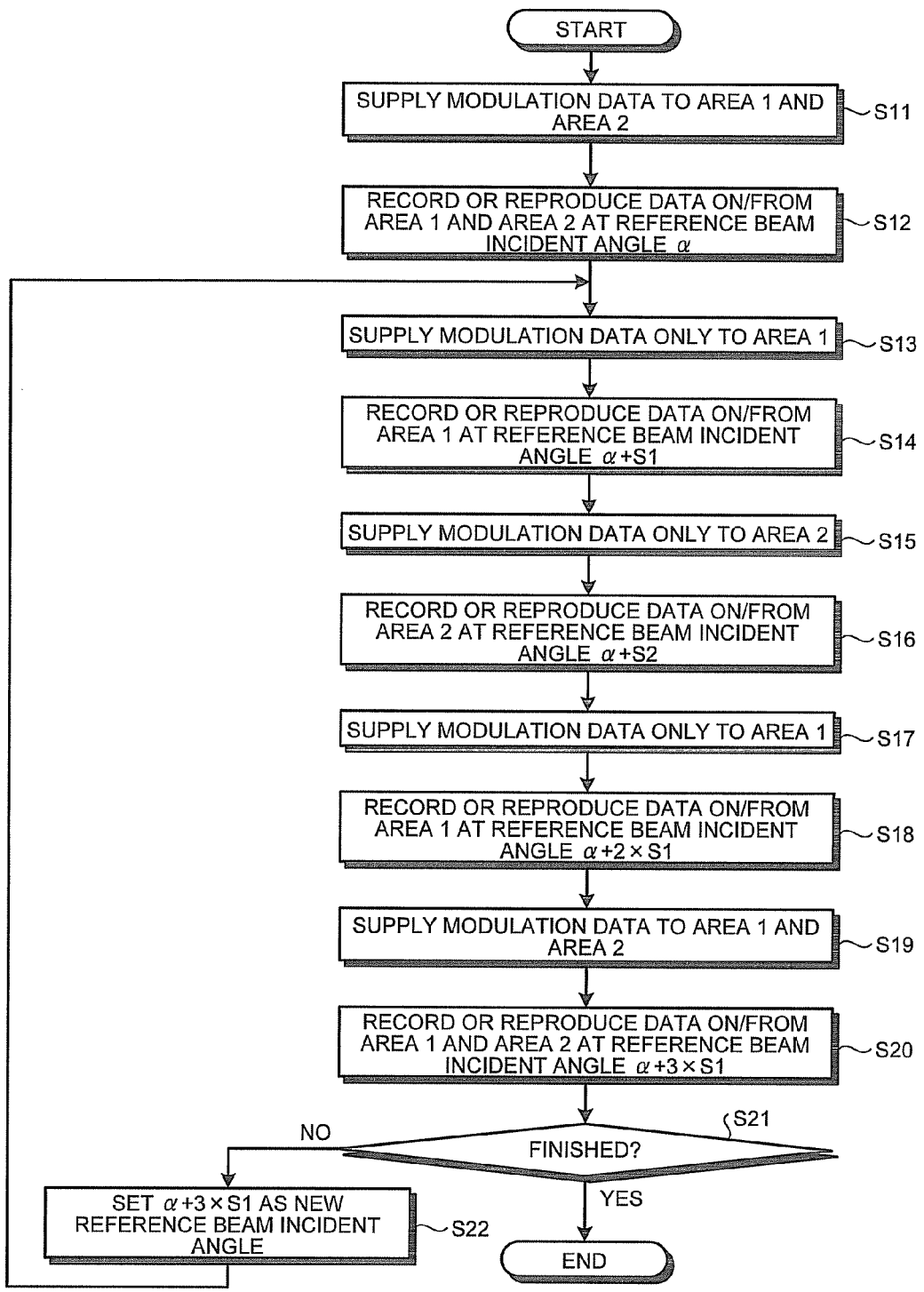
FIG. 8 is an exemplary flowchart illustrating a procedure of a recording and reproducing process.

The recording and reproducing process performed by the system controller 130 and the actuator 140 in the present embodiment configured as above will now be described. FIG. 8 is an exemplary flowchart illustrating a procedure of the recording and reproducing process of information in the first embodiment.

The system controller 130 supplies modulation data to both the area 1 and the area 2 of the spatial light modulator 101 (Step S11). The system controller 130 then records or reproduces data on/from the area 1 and the area 2 by driving the actuator 140 so that the reference beam 112 enters the recording medium 110 at an incident angle α to rotate the recording medium 110 by θy, and causing a semiconductor laser device to emit laser light (Step S12).

Next, the system controller 130 supplies modulation data only to the area 1 (Step S13). The system controller 130 then records or reproduces data on/from the area 1 by rotating the recording medium 110 by θy, so that the reference beam 112 enters the recording medium 110 at an incident angle α+S1 (Step S14).

Next, the system controller 130 supplies modulation data only to the area 2 (Step S15). The system controller 130 then records or reproduces data on/from the area 2 by rotating the recording medium 110 by θy, so that the reference beam 112 enters the recording medium 110 at an incident angle α+S2 (Step S16).

Next, the system controller 130 supplies modulation data only to the area 1 (Step S17). The system controller 130 then records or reproduces data on/from the area 1 by rotating the recording medium 110 by θy, so that the reference beam 112 enters the recording medium 110 at an incident angle α+2×S1 (Step S18).

Next, the system controller 130 supplies modulation data to the area 1 and the area 2 (Step S19). The system controller 130 then records or reproduces data on/from the area 1 and the area 2 by rotating the recording medium 110 by θy, so that the reference beam 112 enters the recording medium 110 at an incident angle α+3×S1 (Step S20).

If the recording and reproduction of all the data is not yet finished (No at Step S21), the system controller 130 repeatedly executes the processes from Steps S13 to S20 by setting a new incident angle of the reference beam 112 to α+3×S1 (Step S22). If the recording and reproduction of all the data is finished, the system controller 130 completes the process.

In this manner, in the present embodiment, the modulation area of the spatial light modulator 101 is divided into the area 1 with good angular selectivity and the area 2 with poor angular selectivity, and the angle multiplex recording or reproduction is performed by changing the θy angle step at each area. Accordingly, the recording medium 110 can realize higher recording density. The number of pixels comprised in the divided areas may differ from one area to another.

The shape of the divided area is not limited to a square but may be a polygon or a circle. The division number and the shape of the area may be changed based on the angle at which the information is recorded or reproduced.

Figure 9:
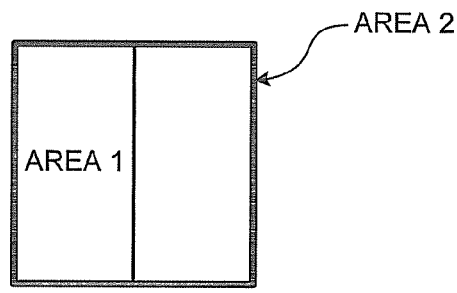
FIG. 9 is an exemplary schematic diagram illustrating the spatial light modulator 101 being divided.
Figure 10:
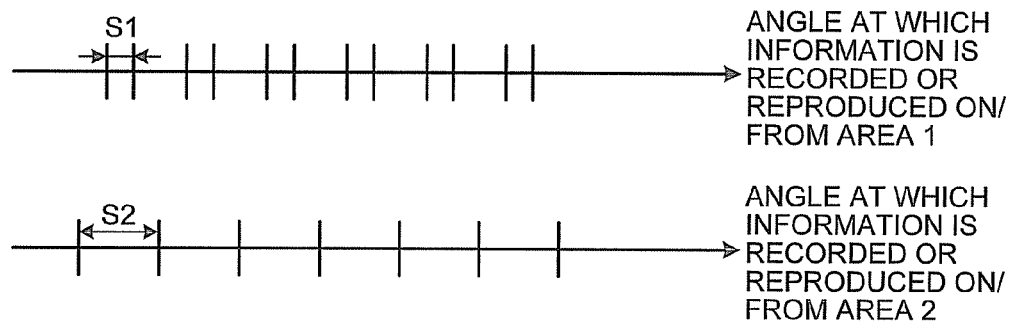
FIG. 10 is an exemplary schematic diagram illustrating θy angle steps relative to the area 1 and the area 2.

As illustrated in FIG. 9, the modulation area of the spatial light modulator 101 may be divided into the area 2 that is the entire modulation area and the area 1 that is a part of the area 2. In such an event, the angular selectivity of the area 2 is poor compared with that of the area 1. When the modulation area is divided in this manner, the θy angle step S1 relative to the area 1 and the θy angle step S2 relative to the area 2 are illustrated as in FIG. 10.

Figure 11:
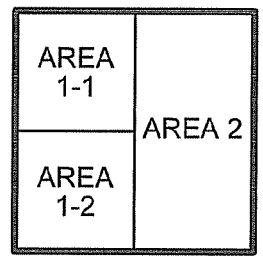
FIG. 11 is an exemplary schematic diagram illustrating the area 1 divided into two areas in the longitudinal direction.

When the modulation area is divided as in FIG. 5 or FIG. 9, the spatial light modulator 101 may be formed by further dividing the area 1 that is an area with good angular selectivity into two areas 1-1 and 1-2 in the longitudinal direction. FIG. 11 is an exemplary schematic diagram illustrating the spatial light modulator 101 in which the area 1 is further divided into two areas 1-1 and 1-2 in the longitudinal direction.

In this case, a reproducing process of information recorded on the recording medium 110 by the information beam that has passed through the area 1-1 and a reproducing process of information recorded on the recording medium 110 by the information beam that has passed through the area 1-2 are performed separately and in parallel. Accordingly, the load to perform the reproducing process is averaged, thereby improving the efficiency of the reproducing process. It is preferable that the size, the shape, and the division number of the divided areas be formed so that the processing amount at each area per unit angle is approximately the same.

It is also preferable that the divided area have one of the sync marks 201. It is also preferable that each of the divided areas be individually processed to be used for reproducing data when information is to be reproduced. In such a configuration, it is possible to perform simple and highly reliable reproducing process. Accordingly, even if information is reproduced in an order different from that when information is recorded, it is possible to easily deal with the reproduction.

The first null angles F1 and F2 are not necessarily constant, but may take different angles depending on the angle at which the information is recorded or reproduced. In such an event, recording and reproduction may be performed by making the angle steps S1 and S2 variable, and by using different angle steps depending on the angle at which the information is recorded or reproduced. The area may also be divided variably. For example, if the area is finely divided at the recording and reproducing angle by which the angular selectivity is overall reduced, or if the area is roughly divided at the recording and reproducing angle by which the overall angular selectivity is improved, information is constantly recorded or reproduced at least at one of the areas using almost constant angle step at any recording and reproducing angle. Accordingly it is possible to realize simple and high-speed recording and reproducing operations.

Second Embodiment

In the first embodiment, the value of the θy angle step during the θy rotation is determined in advance. However, in a recording and reproducing device of a second embodiment, a value of the θy angle step is dynamically determined to be used for the θy rotation.

An optical configuration of the recording and reproducing device of the second embodiment is the same as that of the first embodiment described with reference to FIG. 1. The divisional configuration of the modulation area of the spatial light modulator 101 is also the same as that of the first embodiment. In the present embodiment, a recording process of information performed by the system controller 130 is different from that of the first embodiment.

Figure 12:
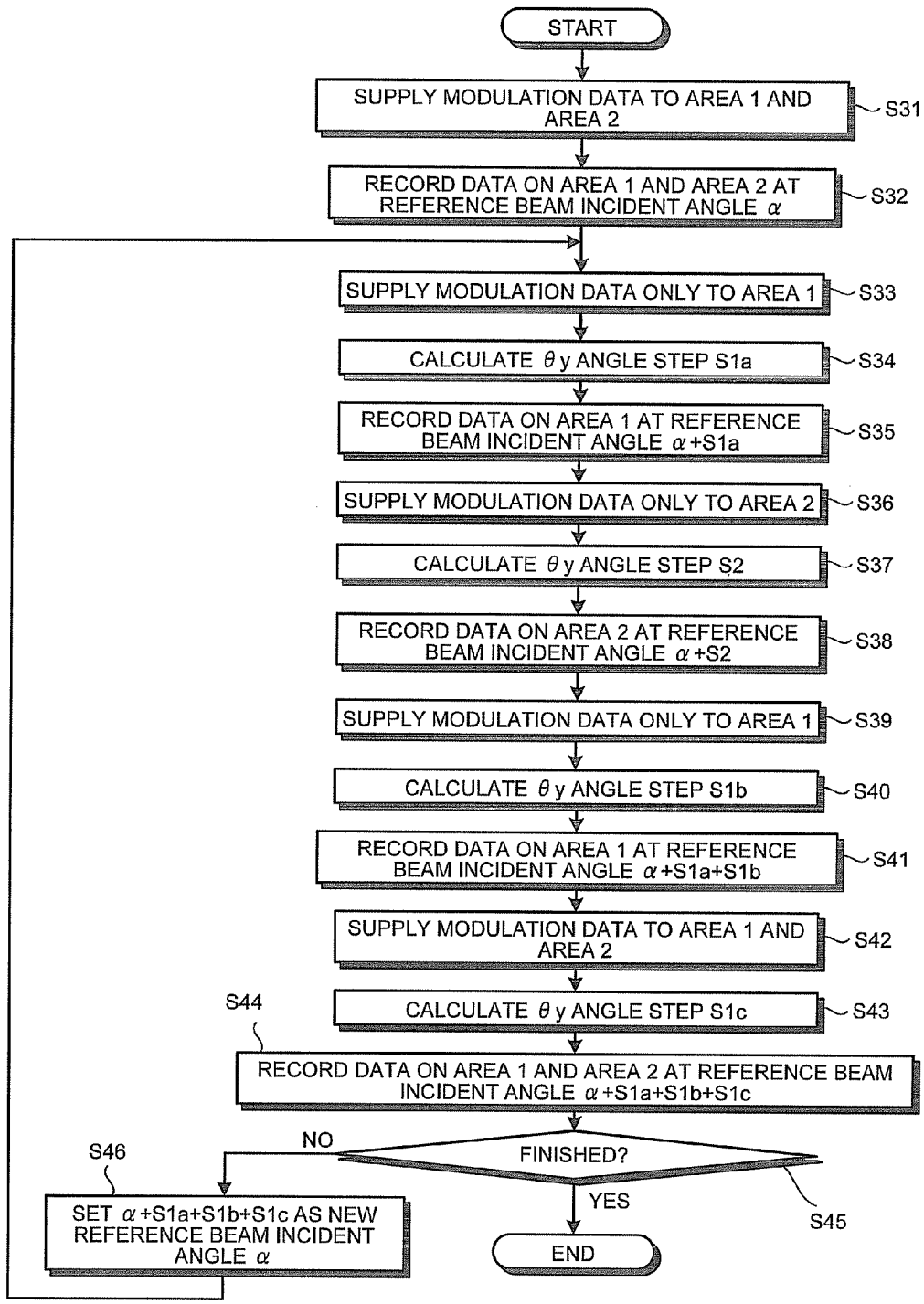
FIG. 12 is an exemplary flowchart illustrating a procedure of an information recording process.

FIG. 12 is an exemplary flowchart illustrating a procedure of a recording process of information of the second embodiment. The system controller 130 supplies modulation data to both the area 1 and the area 2 of the spatial light modulator 101 (Step S31). The system controller 130 then records or reproduces data on/from the area 1 and the area 2 by driving the actuator 140 so that the reference beam 112 enters the recording medium 110 at an incident angle α to rotate the recording medium 110 by θy, and causing the semiconductor laser device to emit laser light (Step S32).

Next, the system controller 130 supplies modulation data only to the area 1 (Step S33). The system controller 130 then calculates a θy angle step S1a (Step S34). The system controller 130 then records data on the area 1 by rotating the recording medium 110 by θy so that the reference beam 112 enters the recording medium 110 at an incident angle α+S1a (Step S35).

Next, the system controller 130 supplies modulation data only to the area 2 (Step S36). The system controller 130 then calculates a θy angle step S2 (Step S37). The system controller 130 then records data on the area 2 by rotating the recording medium 110 by θy so that the reference beam 112 enters the recording medium 110 at an incident angle α+S2 (Step S38).

Next, the system controller 130 supplies modulation data only to the area 1 (Step S39). The system controller 130 then calculates a θy angle step S1b (Step S40). The system controller 130 then records data on the area 1 by rotating the recording medium 110 by θy so that the reference beam 112 enters the recording medium 110 at an incident angle α+S1a+S1b (Step S41).

Next, the system controller 130 supplies modulation data to the area 1 and the area 2 (Step S42). The system controller 130 then calculates a θy angle step S1c (Step S43). The system controller 130 then records data on the area 1 and the area 2 by rotating the recording medium 110 by θy so that the reference beam 112 enters the recording medium 110 at an incident angle α+S1a+S1b+S1c (Step S44).

If the recording and reproduction of all the data is not yet finished (No at Step S45), the system controller 130 repeatedly executes the processes from Step S33 to S44 by setting a new incident angle of the reference beam 112 to α+S1a+S1b+S1c (Step S46). If the recording and reproduction of all the data is finished, the system controller 130 completes the process.

Figure 13:
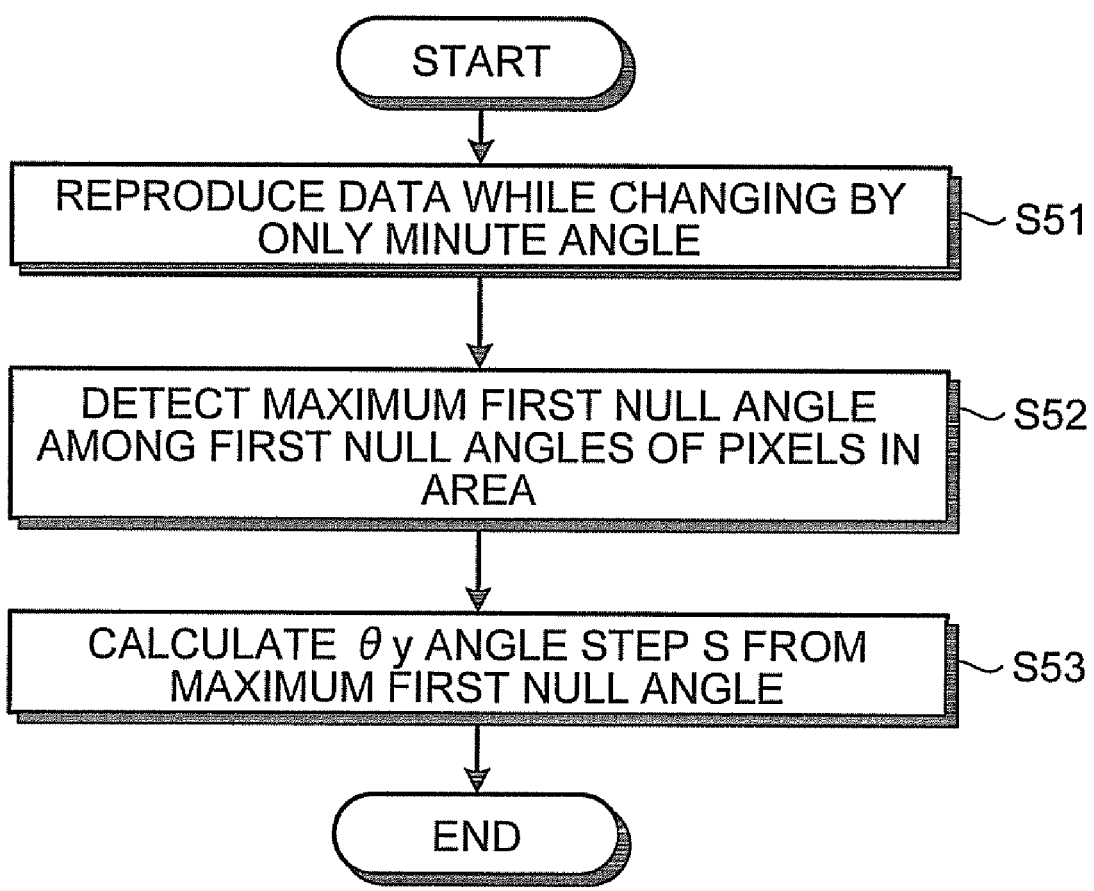
FIG. 13 is an exemplary flowchart illustrating a procedure of a θy angle step calculation process.

A calculation process of the θy angle step at Steps S34, S37, S40, and S43 will now be described. FIG. 13 is an exemplary flowchart illustrating a procedure of the θy angle step calculating process.

The system controller 130 performs reproducing process by sending an instruction to the actuator 140 and rotating the recording medium 110 by only a minute angle of θy (Step S51). The system controller 130 then calculates the first null angle of each of the pixels in the area 1 or the area 2 (the area 1 at Steps S34, S40, and S43, and the area 2 at Steps S37 and S43) from the intensity of the reproduction beam, and detects the maximum first null angle among the first null angles of the pixels (Step S52). The system controller 130 then calculates the θy angle step from the maximum first null angle by using Expression (2) (Step S53).

In this manner, in the recording and reproducing device of the present embodiment, a first null angle is obtained from the reproduction beam, and the θ angle step is dynamically calculated from the first null angle at the processing step of recording information. Accordingly, compared with the device in which the θy angle step calculated in advance is used, even if the first null angle is changed because of the temperature change, the error in the thickness of the hologram recording layer, and the like, it is possible to detect the first null angle in an appropriate manner. As a result, the θy angle step can be calculated in an appropriate manner. Consequently, in the present embodiment, information can be recorded and reproduced more accurately.

In the present embodiment, the θy angle step is calculated based on the first null angle. However, it is not limited thereto. For example, the θy angle step may be calculated based on a second null angle, or the θy angle step may be calculated based on an angle at which the intensity of the reproduction beam is a half of the peak. During reproduction, an angle at which the intensity of the reproduction beam becomes maximal may be calculated from the reproduced image obtained by changing the θy angle by a small amount to be used as the θy angle step.

An angle step of the angle multiplexing about axes other than the y-axis and a shift step during the shift-multiplexing can also be calculated by using the similar method. For example, in the shift-multiplexing, the shift step may be calculated based on the diameter of the information beam 111 at the hologram recording layer or the diameter of the information beam 111 at the focus position. It is also possible to determine the shift step based on the angle at which the intensity of the reproduction beam becomes local minimum by changing the shift amount while reproducing recorded data.

In the embodiments and modifications described above, the θy multiplex recording is performed by rotating the recording medium 110 by θy. However, the θy multiplex recording may also be performed by changing the irradiation angle of the reference beam 112. In this case, the θy angle step at each area can be determined in a manner similar to the first and second embodiments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An optical information recording apparatus comprising:
   a spatial light modulator configured to convert an irradiation beam emitted from a light source to a plurality of partial information beams that carry information by causing the irradiation beam to pass through a plurality of modulation areas;
   an optical mechanism configured to collect the partial information beams onto an optical information recording medium having an information recording layer and configured to apply a reference beam onto the optical information recording medium such that the reference beam and the partial information beams intersect with each other on the information recording layer;
   a driving module configured to drive the optical information recording medium or the optical mechanism; and
   a controller configured to perform angle multiplex recording of information on the information recording layer by controlling the driving module and causing the light source to emit the irradiation beam while switchingly supplying the modulation areas with the information, wherein the modulation areas comprise a first area and a second area, the second area comprising an area through which the partial information beam having a minimum angle with the reference beam has passed.

2. The optical information recording apparatus according to claim 1, wherein the first area comprises an area through which the partial information beam having a maximum angle with the reference beam has passed.

3. The optical information recording apparatus according to claim 2, wherein the second area comprises the first area and an area through which one of the partial information beams having a minimum angle with the reference beam has passed.

4. The optical information recording apparatus according to claim 1, wherein
   the first area is further divided into a plurality of small areas, and
   the controller reproduces the information recorded by the partial information beams modulated by the small areas separately for each of the small areas.

5. The optical information recording apparatus according to claim 1, wherein the modulation areas comprise three or more areas through which the partial information beams having different angles with the reference beam pass.

6. The optical information recording apparatus according to claim 1, further comprising:
   a light receiving module configured to receive a reproduction beam of information emitted from the information recording layer and configured to output a reproduction signal based on the reproduction beam being received; and
   a determining module configured to determine a certain angle step that is a predetermined rotation angle at which the optical information recording medium is rotationally driven, based on the reproduction signal, wherein
   the driving module rotationally drives the optical information recording medium, and
   the controller is configured to perform the angle multiplex recording of the information on the information recording layer by switching the modulation areas, rotationally driving the optical information recording medium for each angle step being determined, and causing the light source to emit the irradiation beam at a timing at which the optical information recording medium is rotationally driven for each angle step.

7. The optical information recording apparatus according to claim 1, wherein the controller performs the angle multiplex recording with a smaller angle step for the partial information beams that pass through the first area than the angle step for the partial information beams that pass through the second area.

8. The optical information recording apparatus according to claim 7, wherein the angle step is an angle equal to or more than a null angle indicating an angle at which intensity of reproduction beam becomes local minimum.

* * * * *